(12) United States Patent
Kusaka

(10) Patent No.: US 12,413,118 B2
(45) Date of Patent: Sep. 9, 2025

(54) DRIVE UNIT

(71) Applicant: TOYOTA JIDOSHA KABUSHIKI KAISHA, Aichi-ken (JP)

(72) Inventor: Hiroto Kusaka, Susono (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 252 days.

(21) Appl. No.: 18/351,495

(22) Filed: Jul. 13, 2023

(65) Prior Publication Data

US 2024/0072615 A1    Feb. 29, 2024

(30) Foreign Application Priority Data

Aug. 31, 2022 (JP) ................. 2022-138456

(51) Int. Cl.
*H02K 11/00* (2016.01)
*B60K 17/12* (2006.01)
*H02K 11/33* (2016.01)

(52) U.S. Cl.
CPC .......... *H02K 11/0094* (2013.01); *B60K 17/12* (2013.01); *H02K 11/33* (2016.01)

(58) Field of Classification Search
CPC .... H02K 11/0094; H02K 11/33; H02K 7/116; H02K 11/30; H02K 11/02; B60K 17/12; B60K 1/00; B60K 2001/001; F16H 37/082; H02M 1/44; H02P 27/06
See application file for complete search history.

(56) References Cited

U.S. PATENT DOCUMENTS

| | | | |
|---|---|---|---|
| 2018/0363755 A1 | 12/2018 | Wakui | |
| 2019/0084403 A1* | 3/2019 | Nishikawa | B60K 17/105 |
| 2021/0129654 A1* | 5/2021 | Krause | B60K 6/405 |
| 2021/0320566 A1* | 10/2021 | Yamamoto | H02K 5/06 |

FOREIGN PATENT DOCUMENTS

| | | |
|---|---|---|
| JP | 2017099096 A | 6/2017 |
| JP | 2019001399 A | 1/2019 |
| JP | 2020-078971 A | 5/2020 |
| JP | 2021168562 A | 10/2021 |

* cited by examiner

*Primary Examiner* — Mohamad A Musleh
(74) *Attorney, Agent, or Firm* — HAUPTMAN HAM, LLP

(57) ABSTRACT

A drive unit includes: a transaxle case that houses a motor, a speed reducer, and a differential mechanism; a power control unit that controls the motor; and a noise filter electrically connected to the motor via the power control unit, the power control unit being integrated with the transaxle case, the motor, the speed reducer, and the differential mechanism being disposed on a same axis inside the transaxle case. Further, the power control unit is separate from the noise filter, and the noise filter is integrated with the transaxle case in a state in which at least a part of the noise filter is disposed in space between the power control unit and the motor.

3 Claims, 8 Drawing Sheets

AXIAL DIRECTION

DRIVE UNIT

CROSS-REFERENCE TO RELATED APPLICATION(S)

The present application claims priority to and incorporates by reference the entire contents of Japanese Patent Application No. 2022-138456 filed in Japan on Aug. 31, 2022.

BACKGROUND

The present disclosure relates to a drive unit.

Japanese Laid-open Patent Publication NO. 2020-078971 discloses a structure of a drive unit of an electric vehicle, in which a power control unit for controlling a motor is integrated with a case for housing the motor, a speed reducer, and a differential mechanism (electromechanical integrated structure). In the configuration described in Japanese Laid-open Patent Publication NO. 2020-078971, a transaxle having a triaxial structure, in which the motor, the speed reducer, and the differential mechanism are disposed on different axes, is formed.

SUMMARY

There is a need for providing a drive unit capable of efficiently disposing a power control unit and a noise filter in an electromechanical integrated structure.

According to an embodiment, a drive unit includes: a transaxle case that houses a motor, a speed reducer, and a differential mechanism; a power control unit that controls the motor; and a noise filter electrically connected to the motor via the power control unit, the power control unit being integrated with the transaxle case, the motor, the speed reducer, and the differential mechanism being disposed on a same axis inside the transaxle case. Further, the power control unit is separate from the noise filter, and the noise filter is integrated with the transaxle case in a state in which at least a part of the noise filter is disposed in space between the power control unit and the motor.

DETAILED DESCRIPTION

In the related art, in addition to a transaxle having a triaxial structure, there is known a transaxle having a uniaxial structure in which a motor, a speed reducer, and a differential mechanism are disposed on the same axis. The transaxle having a uniaxial structure can be downsized as compared with the transaxle having a triaxial structure. Therefore, an electromechanical integrated structure is conceivable for a drive unit including a transaxle having a uniaxial structure.

In the related art, since a power control unit needs to satisfy a standard related to electromagnetic compatibility (EMC), an electric circuit in which a noise filter and the power control unit are electrically connected is formed for addressing EMC noise. Therefore, a structure of the drive unit including the transaxle having a uniaxial structure is considered in which a noise filter is provided and integrated with a case for housing the transaxle having a uniaxial structure.

The size of the case for housing the transaxle having a uniaxial structure is, however, smaller than the size of a case for housing the transaxle having a triaxial structure. As a result, if the electromechanical integrated structure is formed, it becomes difficult to secure space for installing the power control unit in a case, and there arises a need for further securing space for installing the noise filter.

A drive unit according to an embodiment of the present disclosure will be specifically described below with reference to the drawings. Note that the present disclosure is not limited to the embodiment described below.

Figure 1:
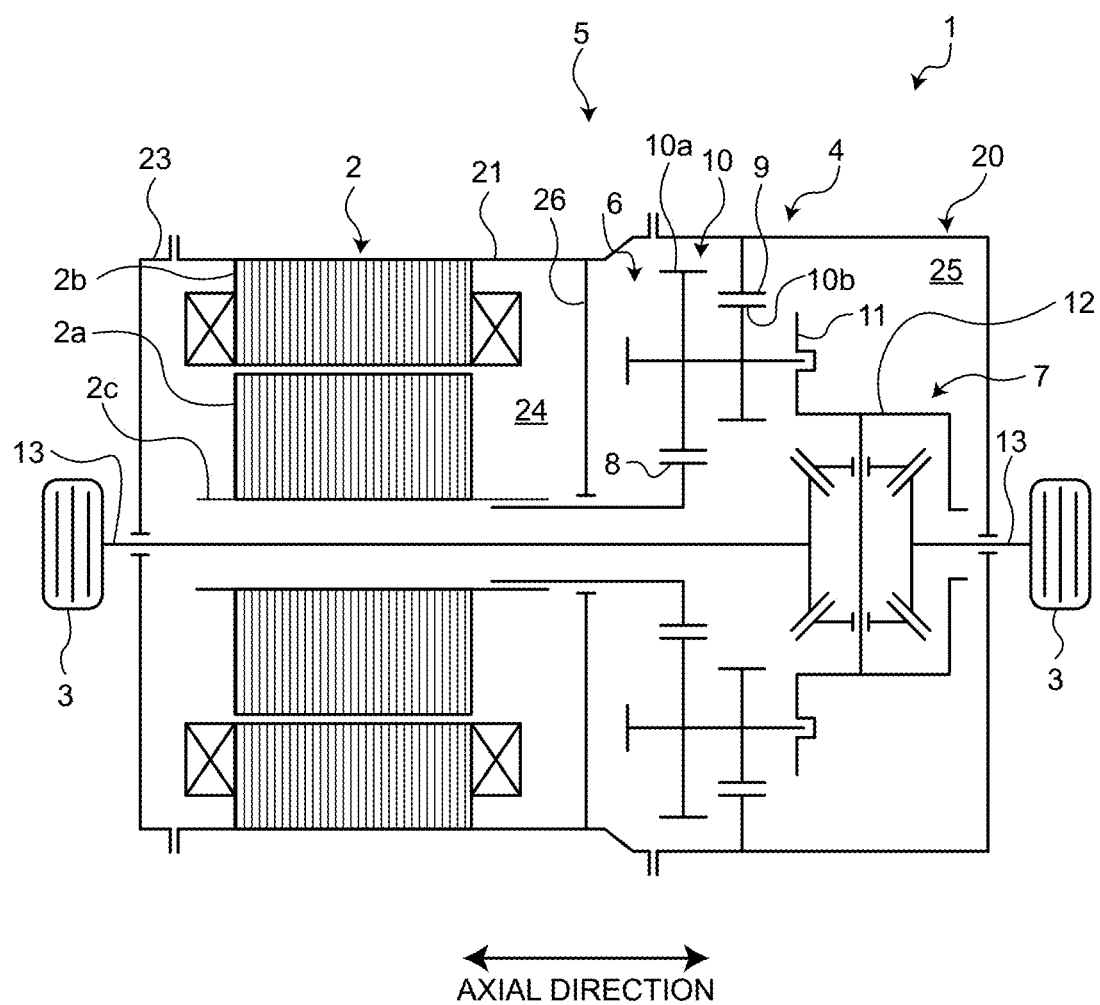
FIG. 1 schematically illustrates a vehicle according to an embodiment.

FIG. 1 schematically illustrates a vehicle according to the embodiment. A vehicle 1 is an electric vehicle mounted with a motor 2 serving as a power source. The vehicle 1 includes the motor 2 for traveling and a power transmission device 4 that transmits power of the motor 2 to wheels 3. A drive unit 5 mounted in the vehicle 1 includes the motor 2, the power transmission device 4, and a case 20.

The motor 2 is a motor/generator that functions as an electric motor and a generator. The motor 2 is driven by electric power supplied from a battery. The motor 2 can generate electric power by receiving torque input from the wheels 3. The motor 2 includes a rotor 2a, a stator 2b, and a rotor shaft 2c.

The rotor 2a rotates integrally with the rotor shaft 2c. A coil is wound around a stator core of the stator 2b. The stator 2b is fixed to the case 20 in a state of being disposed on the outer peripheral side of the rotor 2a. The rotor shaft 2c is a rotation shaft of the motor 2. The rotor shaft 2c is disposed so as to extend along the vehicle width direction of the vehicle 1, and is rotatably supported by the case 20 via a bearing. An axial direction of the motor 2 is the same as the vehicle width direction of the vehicle 1.

The power transmission device 4 forms a power transmission path between the motor 2 and the wheels 3. The power transmission device 4 includes a speed reducer 6 and a differential mechanism 7. The power transmission device 4 includes a transaxle having a uniaxial structure in which the motor 2, the speed reducer 6, and the differential mechanism 7 are disposed on the same axis.

When transmitting the power input from the motor 2 to the differential mechanism 7, the speed reducer 6 reduces rotation input from the motor 2, and outputs the rotation to the differential mechanism 7. The speed reducer 6 includes a planetary gear mechanism. The speed reducer 6 includes a sun gear 8, a ring gear 9, and a carrier 11. The ring gear 9 is disposed concentrically with the sun gear 8. The carrier 11 rotatably and revolvably holds a pinion gear 10 meshed with the sun gear 8 and the ring gear 9. The pinion gear 10 is a stepped pinion gear having a large diameter portion 10a and a small diameter portion 10b.

The rotor 2a is coupled to the sun gear 8. Since a rotation shaft of the sun gear 8 is spline-fitted to the rotor shaft 2c of the motor 2, the sun gear 8 rotates integrally with the rotor shaft 2c. In the pinion gear 10, the large diameter portion 10a meshes with the sun gear 8, and the small diameter portion 10b meshes with the ring gear 9. The ring gear 9 is fixed to the case 20. The wheels 3 are coupled to the carrier 11 via the differential mechanism 7. The carrier 11 rotates integrally with a differential case 12 of the differential mechanism 7. The sun gear 8 is an input element. The ring gear 9 is a reaction element. The carrier 11 is an output element.

The differential mechanism 7 is a differential device that allows differential rotation of a pair of right and left axles 13. The differential mechanism 7 includes the differential case 12, which is a rotating member. The differential case 12 rotates integrally with the carrier 11 of the speed reducer 6. The differential mechanism 7 transmits the power transmitted from the motor 2 via the speed reducer 6 to the wheels 3 while allowing the difference between rotation speeds of the pair of right and left axles 13.

The case 20 is a transaxle case that houses the motor 2, the speed reducer 6, and the differential mechanism 7. In the case 20, the motor 2, the speed reducer 6, and the differential mechanism 7 are disposed on the same axis. The case 20 houses a transaxle having a uniaxial structure. The case 20 includes a first case member 21, a second case member 22, and a cover member 23.

The first case member 21 functions as a motor case, and has a shape in which both axial sides are opened. The second case member 22 functions as a gear case, and is attached to one axial end of the first case member 21. The cover member 23 functions as a part of the motor case, and is attached to the other axial end of the first case member 21. The first case member 21 and the second case member 22 are integrated by bolt fastening. The first case member 21 and the cover member 23 are integrated by bolt fastening.

In the case 20, the cover member 23, the first case member 21, and the second case member 22 are disposed in this order from the other side to one side in the axial direction of the motor 2, and a motor chamber 24 and a gear chamber 25 are formed. The motor chamber 24 is space for housing the motor 2. The gear chamber 25 is space for housing the speed reducer 6 and the differential mechanism 7.

The motor chamber 24 includes the cover member 23 and the first case member 21. The gear chamber 25 includes the first case member 21 and the second case member 22. The first case member 21 internally includes a partition wall 26. The partition wall 26 separates the motor chamber 24 from the gear chamber 25.

Figure 2:
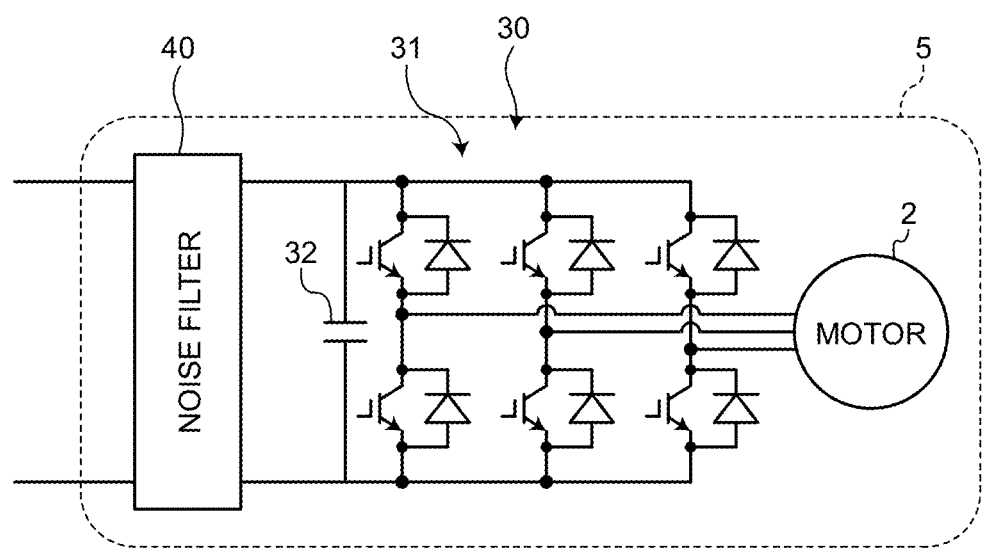
FIG. 2 illustrates an electric circuit included in a drive unit.

FIG. 2 illustrates an electric circuit included in the drive unit. The drive unit 5 includes a power control unit (hereinafter referred to as PCU) 30 and a noise filter 40.

The PCU 30 controls the motor 2. The PCU 30 includes an inverter 31 that drives the motor 2. The inverter 31 is a power conversion device that converts DC power supplied from the battery into AC power, and supplies the AC power to the motor 2. The inverter 31 includes a plurality of switching elements, and performs a switching operation under the control of an electronic control device.

The noise filter 40 is electrically connected to the PCU 30. The noise filter 40 is provided in an electric circuit between the battery and the PCU 30, and reduces noise when electric power from the battery is supplied to the inverter 31. The noise filter 40 reduces, for example, EMC noise. In the electric circuit, the noise filter 40 is provided on a positive electrode line and a negative electrode line. In the electric circuit, a smoothing capacitor 32 is provided between the noise filter 40 and the inverter 31. The smoothing capacitor 32 smooths the electric power output from the noise filter 40, and supplies the power to the inverter 31.

Figure 3:
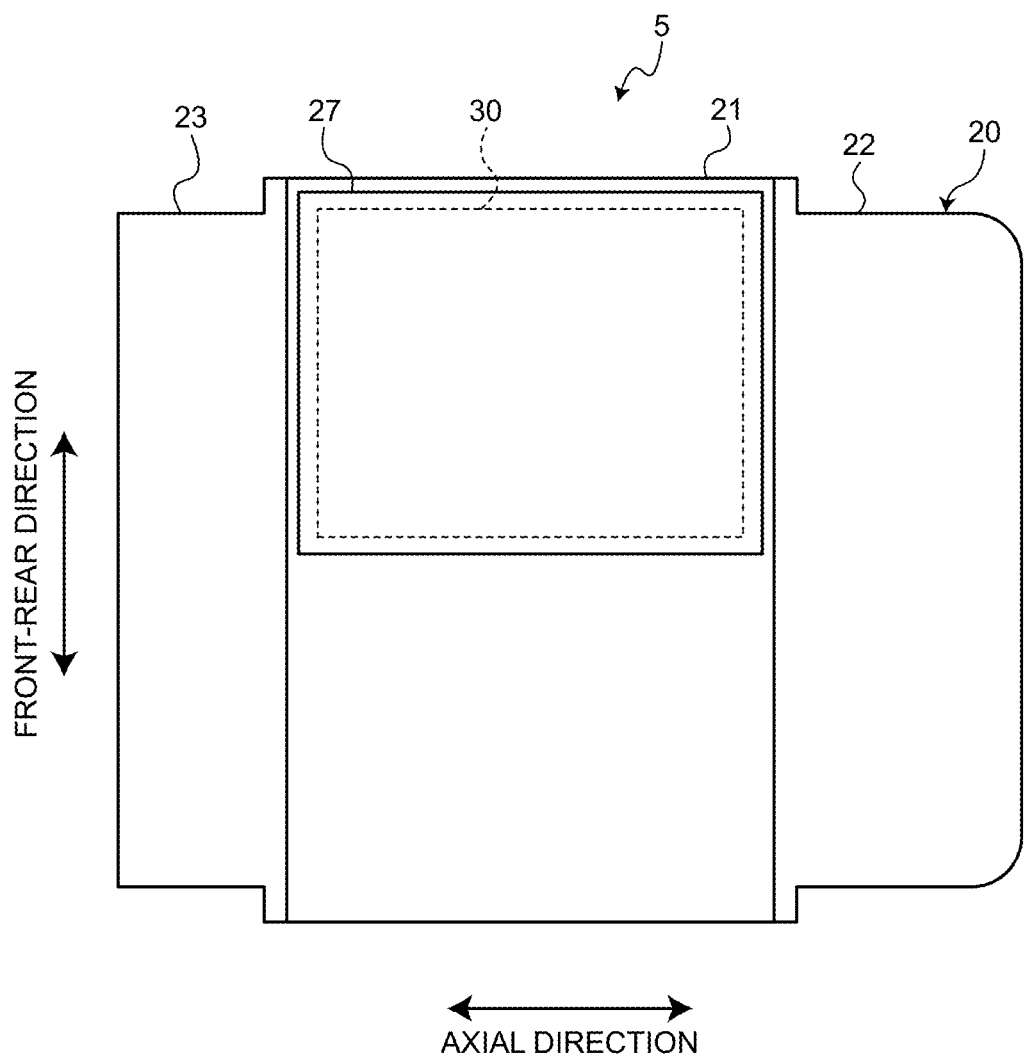
FIG. 3 schematically illustrates the drive unit formed in an electromechanical integrated structure.

Here, the arrangement of the PCU 30 and the noise filter 40 in the drive unit 5 having an electromechanical integrated structure will be described with reference to FIGS. 3 to 5.

The drive unit 5 has a structure in which the PCU 30 is integrated with the case 20 (electromechanical integrated structure). In the drive unit 5 having the electromechanical integrated structure, the noise filter 40 is integrated with the case 20 in addition to the PCU 30.

Figure 4:
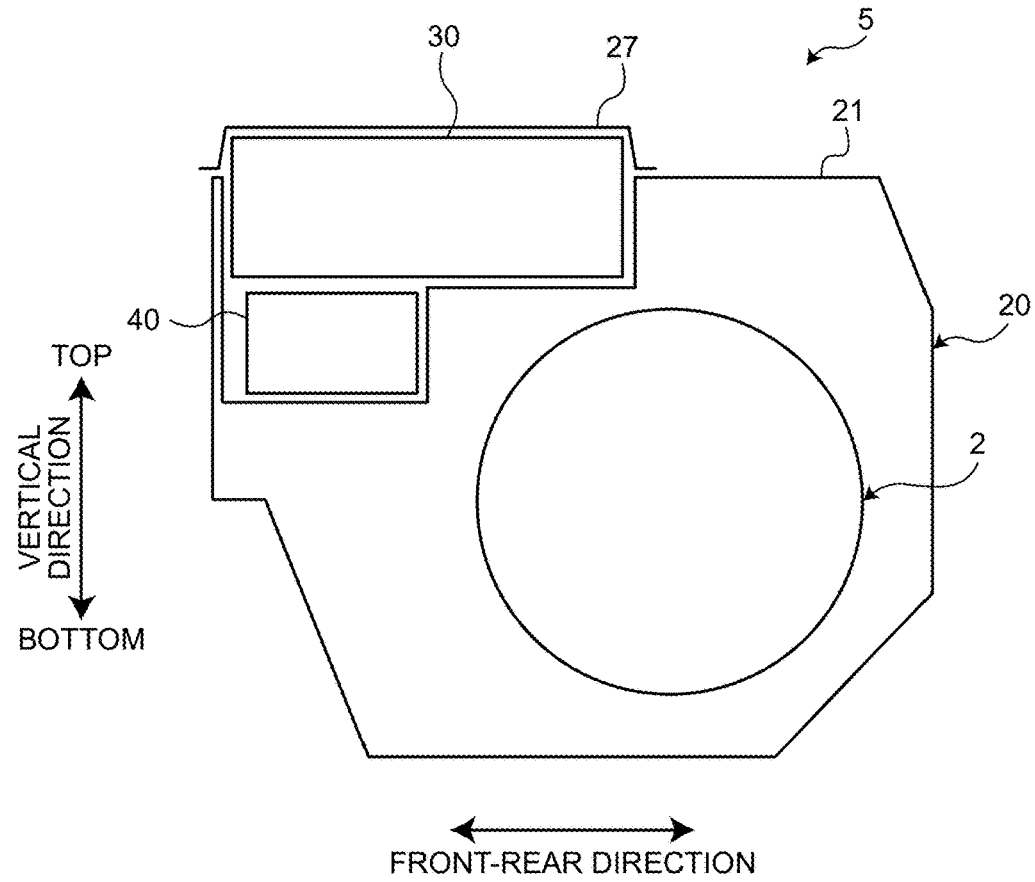
FIG. 4 illustrates space for installing a PCU and a noise filter.
Figure 5:
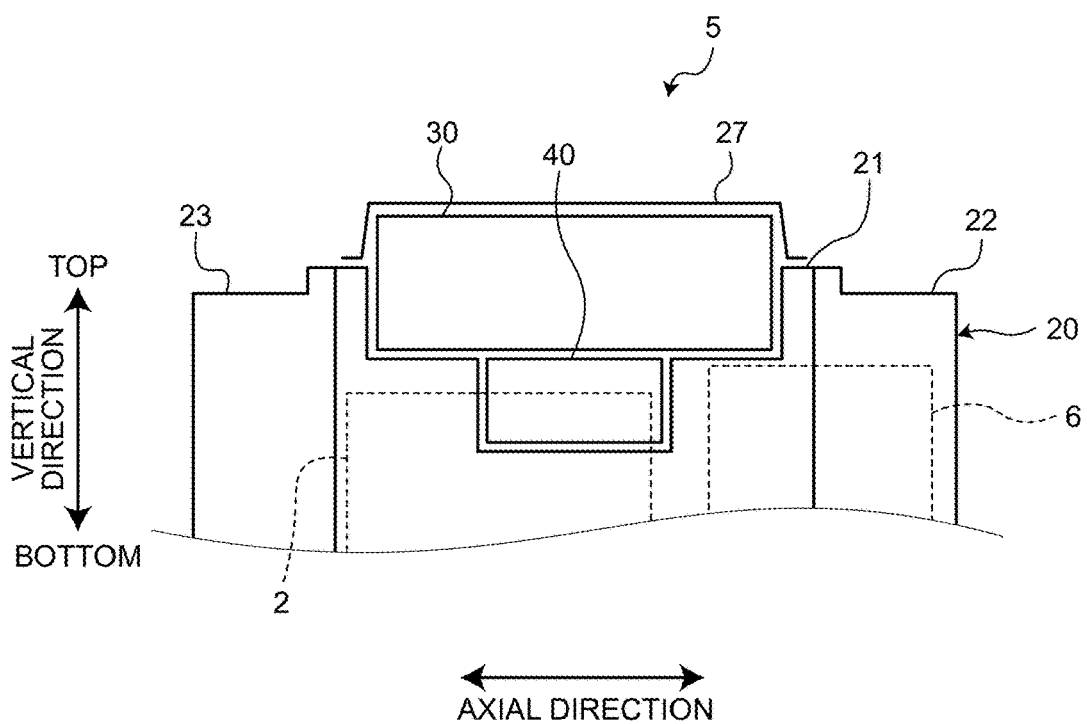
FIG. 5 illustrates the arrangement of the PCU and the noise filter.

Furthermore, since the drive unit 5 includes a transaxle having a uniaxial structure, the horizontal size of the case 20 is smaller than the size of a case that houses a transaxle having a triaxial structure in a plane orthogonal to the axial direction of the motor 2 as illustrated in FIG. 4. This can reduce the size, but makes it difficult to secure space for installing the PCU 30 and the noise filter 40. Therefore, in the drive unit 5, the PCU 30 and the noise filter 40 are disposed with high space efficiency.

When the PCU 30 and the noise filter 40 are attached to the case that houses a transaxle having a triaxial structure, the differential mechanism is disposed on an axis different from the axis of the motor and at a position different from the axial position of the motor, so that, as a comparison, installation space for the PCU 30 and the noise filter 40 is easily secured near the motor by utilizing space on an axis of the differential mechanism in the plane orthogonal to the axial direction of the motor. In contrast, the case 20 that houses a transaxle having a uniaxial structure is smaller in size than that having a triaxial structure. Thus, if the PCU 30 and the noise filter 40 are disposed at positions similar to those in the triaxial structure, the drive unit 5 has an irregular entire shape. Therefore, the drive unit 5 is configured to increase the space efficiency while inhibiting the imbalance of the entire shape.

Specifically, the PCU 30 and the noise filter 40 are attached to the first case member 21 of the case 20. The PCU 30 is separate from the noise filter 40. Since the noise filter 40 needs to be connected to the positive electrode line and the negative electrode line, the noise filter 40 needs to be disposed at a position close to the PCU 30. The noise filter 40 is disposed on the back surface side of the PCU 30, and is disposed in space between the motor 2 and the PCU 30. The noise filter 40 is disposed in the space sandwiched between the motor 2 and the PCU 30.

The PCU 30 is attached to an upper portion of the first case member 21 in a state of being housed inside the PCU case. That is, the PCU case is attached to the first case member 21. A cover member 27 is attached to an upper portion of the case 20. Space formed by the case 20 and the cover member 27 is used for installing the PCU 30 and the noise filter 40. The noise filter 40 is integrated with the first case member 21 in a state of being disposed in space sandwiched between the back surface of the PCU case and the first case member 21.

In the case 20, an oil pipe is disposed in space above the motor chamber 24. The oil pipe is disposed immediately above the stator 2b, and supplies oil for cooling the motor 2 to an upper portion of the stator 2b. That is, since the space for housing the PCU 30 is restricted by the oil pipe, the space is formed at a position horizontally shifted from immediately above the motor 2. Moreover, in the case 20, a catch tank is disposed in space above the gear chamber 25. The catch tank stores oil in the gear chamber 25, and catches oil scraped up by rotations of the speed reducer 6 and the differential mechanism 7. The oil stored in the catch tank is supplied to the oil pipe.

Therefore, the noise filter 40 is disposed in the space between the motor 2 and the PCU 30 in a radial direction of the motor 2. In the axial direction of the motor 2, the PCU 30 is disposed at a position where the PCU 30 overlaps a part of the motor 2 and a part of the speed reducer 6, and the noise filter 40 is disposed at a position where the noise filter 40 overlaps the motor 2.

Furthermore, the noise filter 40 is disposed in space sandwiched between a connection portion and the speed reducer 6. The connection portion electrically connects the motor 2 and the PCU 30 with each other. The connection portion is a member that electrically connects the motor 2 and the inverter 31 with each other, and includes a three-phase connection portion including bus bars of respective phases. For example, the three-phase connection portion includes a connection base on which a three-phase bus bar is installed. The three-phase bus bar electrically connects a U-phase coil, a V-phase coil, and a W-phase coil of the motor 2 with the inverter 31.

The aspect ratio of the PCU 30 cannot be freely changed. The PCU 30 has a lower degree of freedom than the noise filter 40. Therefore, a location where the PCU 30 can be installed is easily restricted to a place having a large plane area. Then, since the first case member 21 forming the motor chamber 24 can have the largest area in the case 20, the PCU 30 is attached to the first case member 21.

The noise filter 40 has a higher degree of freedom in shape than the PCU 30. Therefore, the connection portion between the motor 2 and the PCU 30 and the gear chamber 25 are located on both sides of a housing portion of the noise filter 40. Space for installing the noise filter 40 can be secured even in a place where the installation space is easily restricted by shape, that is, a place where the axial length cannot be easily secured in the case 20.

As described above, in the drive unit 5 having the electromechanical integrated structure, the space efficiency can be enhanced by installing the noise filter 40 in the space between the motor 2 and the PCU 30. As a result, in the drive unit 5, the transaxle having a uniaxial structure can save space while space for mounting the noise filter 40 in the electromechanical integrated structure can be secured. Furthermore, since the noise filter 40 is separate from the PCU 30, the noise filter 40 can be mounted even if the noise filter 40 is enlarged.

Furthermore, the capacity of the catch tank can be increased in the gear chamber 25 inside the second case member 22 by attaching the PCU 30 and the noise filter 40 to the first case member 21.

Note that the PCU 30 is not required to be entirely attached to the first case member 21. Similarly, the noise filter 40 is not required to be entirely attached to the first case member 21. Only at least parts of the PCU 30 and the noise filter 40 are required to be attached to the first case member 21. The remaining part may be attached to the second case member 22 and the cover member 23.

Furthermore, the cover member 27 is not necessarily provided. That is, the present disclosure is not limited to a structure in which the PCU 30 and the noise filter 40 are housed in closed space formed by the cover member 27.

Furthermore, the noise filter 40 is not required to be entirely disposed in the space between the PCU 30 and the motor 2. That is, the noise filter 40 is only required to be attached to the case 20 in a state in which at least a part of the noise filter 40 is disposed in the space between the PCU 30 and the motor 2.

Furthermore, the noise filter 40 is not required to be entirely disposed in space between the connection portion electrically connecting the motor 2 and the PCU 30 with each other and the speed reducer 6. That is, only at least a part of the noise filter 40 is required to be disposed in the space between the connection portion electrically connecting the motor 2 and the PCU 30 with each other and the speed reducer 6.

Furthermore, installation places of the PCU 30 and the noise filter 40 are not limited to an upper portion of the case 20. The PCU 30 and the noise filter 40 can be disposed at a front portion, a rear portion, and a lower portion of the case 20. FIGS. 6 to 9 illustrate one example of variations.

Figure 6:
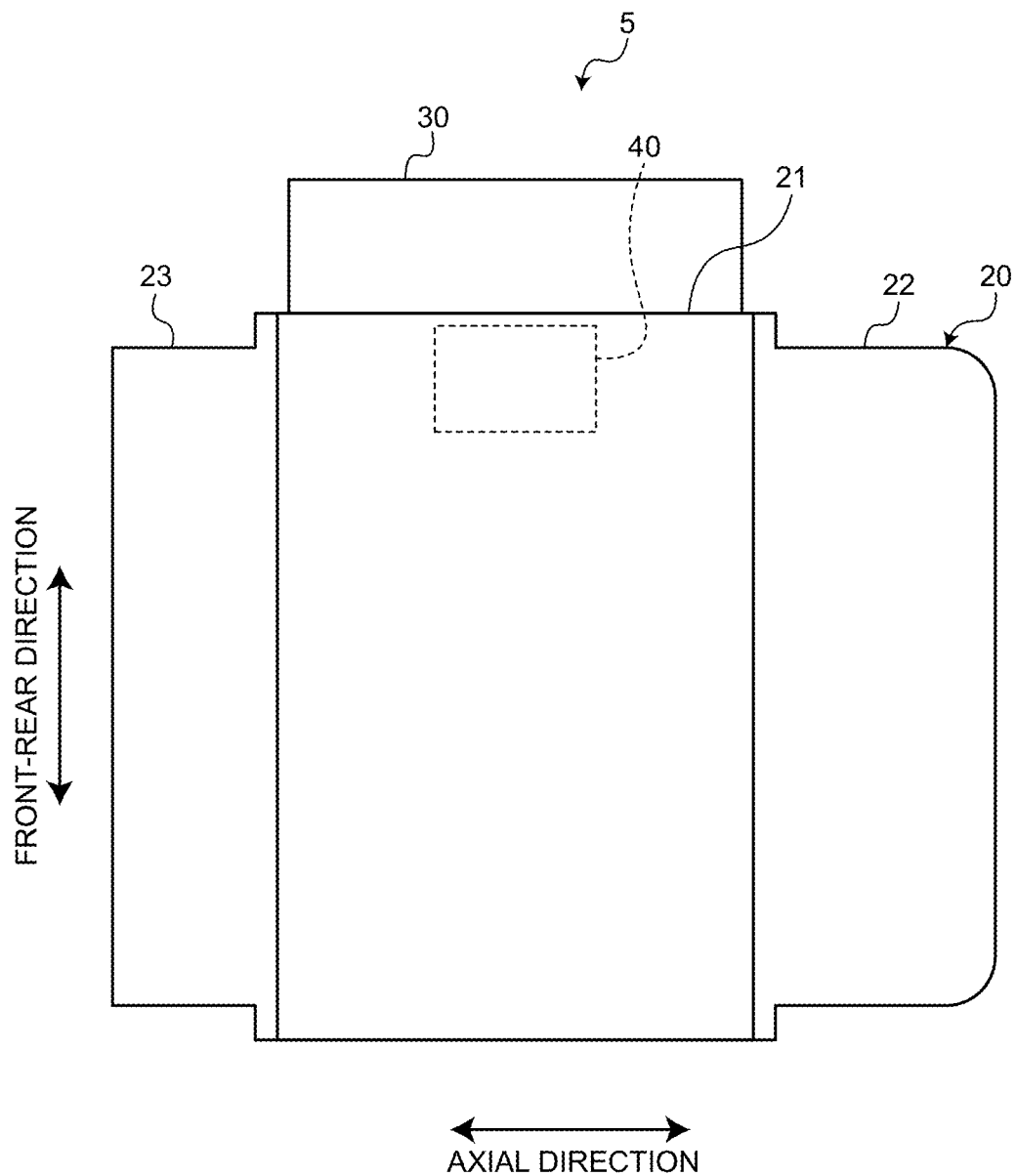
FIG. 6 schematically illustrates a drive unit according to a variation.
Figure 7:
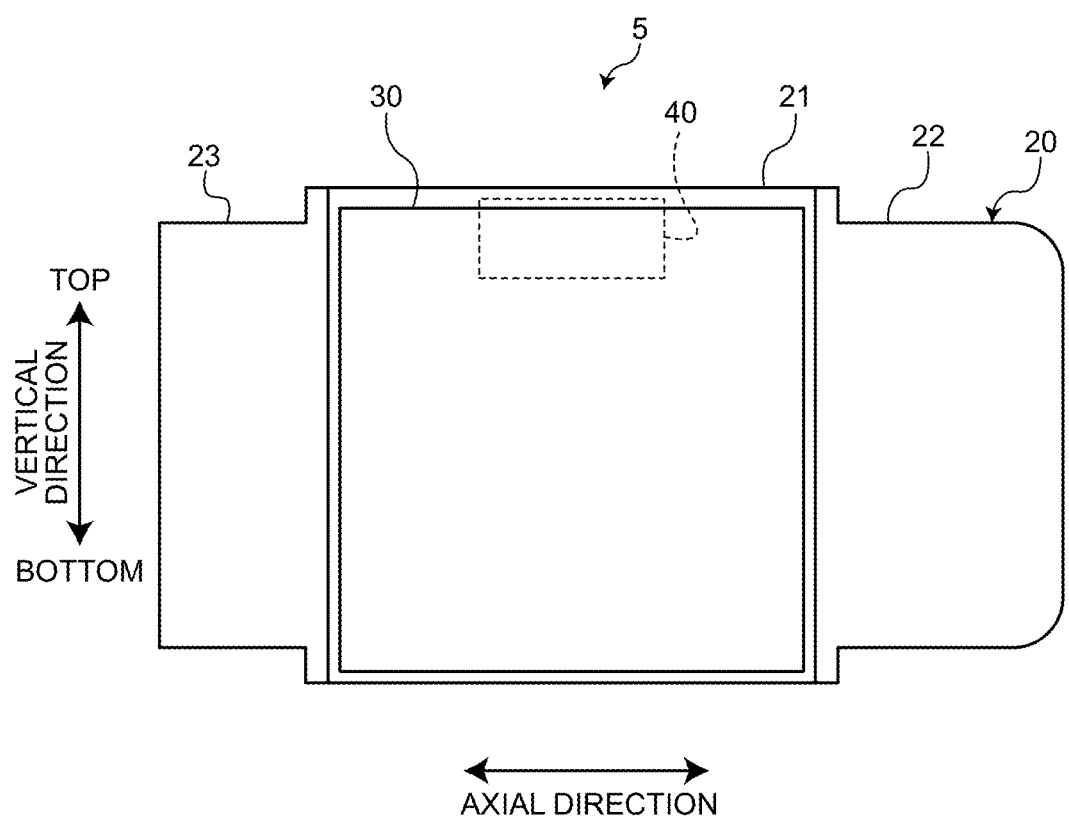
FIG. 7 illustrates the arrangement of a PCU and a noise filter according to the variation.
Figure 8:
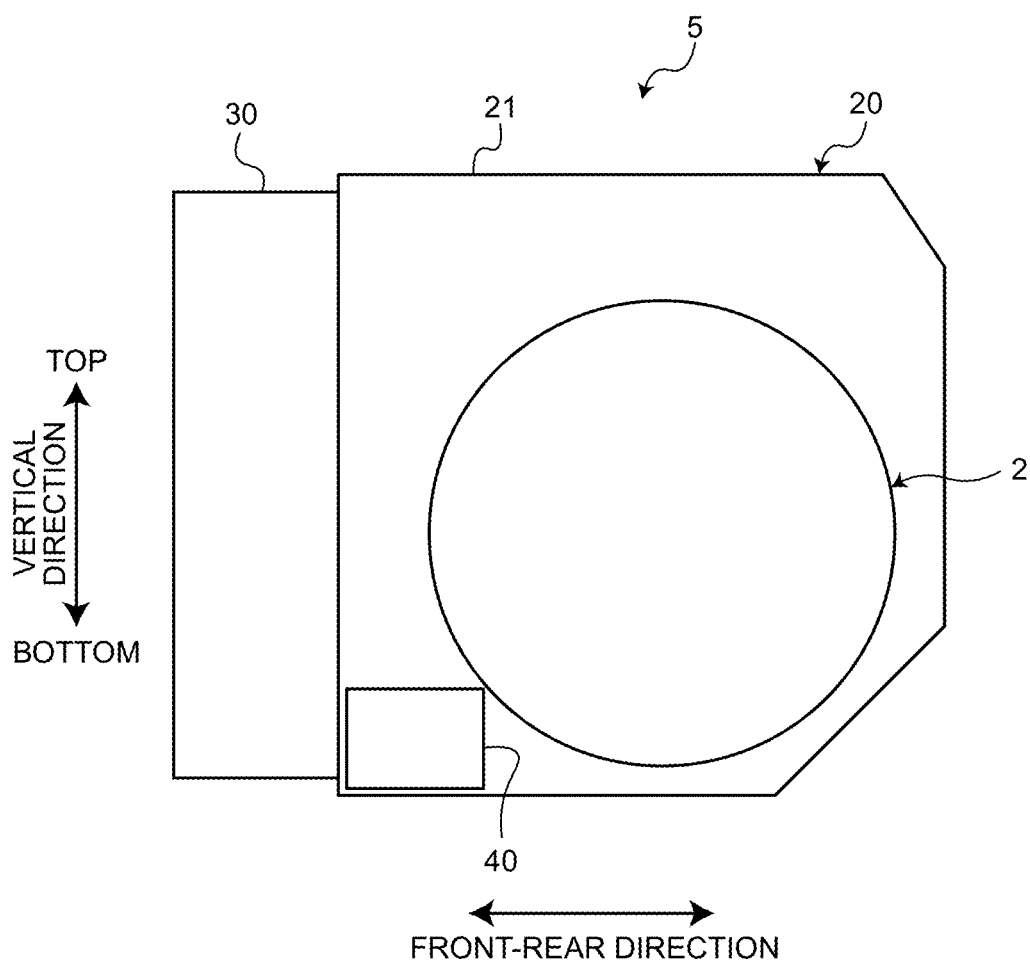
FIG. 8 illustrates the arrangement of the noise filter according to the variation.

As illustrated in FIGS. 6 to 8, the PCU 30 is attached to the front portion of the case 20 in the drive unit 5 according to a variation. The noise filter 40 is disposed in the space between the PCU 30 and the motor 2 in the front-rear direction of the vehicle 1, and is disposed below the rotation center position of the motor 2 in the vertical direction of the vehicle 1.

Figure 9:
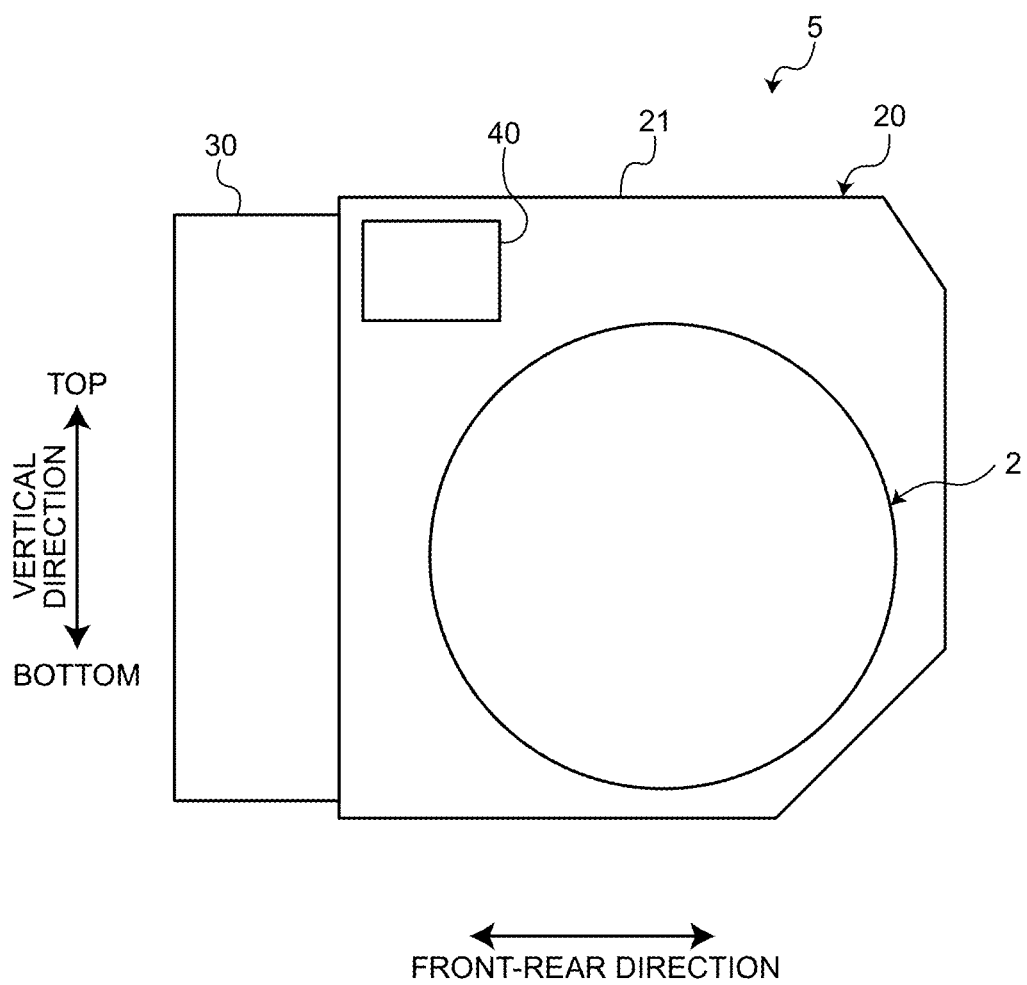
FIG. 9 illustrates the arrangement of a noise filter according to another variation.

As illustrated in FIG. 9, the noise filter 40 may be disposed above the rotation center position of the motor 2 in the vertical direction of the vehicle 1 in the drive unit 5 according to another variation.

In the present disclosure, a power control unit and a noise filter can be efficiently disposed in an electromechanical integrated structure.

According to an embodiment, a power control unit and a noise filter can be efficiently disposed in an electromechanical integrated structure.

According to an embodiment, the noise filter can be disposed with high space efficiency.

According to an embodiment, the noise filter can be disposed with high space efficiency.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A drive unit comprising:
   a transaxle case that houses a motor, a speed reducer, and a differential mechanism;
   a power control unit that controls the motor; and
   a noise filter electrically connected to the motor via the power control unit,
   the power control unit being integrated with the transaxle case, the motor, the speed reducer, and the differential mechanism being disposed on a same axis inside the transaxle case,
   wherein the power control unit is separate from the noise filter, and
   the noise filter is integrated with the transaxle case in a state in which at least a part of the noise filter is disposed in space between the power control unit and the motor.

2. The drive unit according to claim 1, further comprising a connection portion that electrically connects the motor and the power control unit with each other,
   wherein at least a part of the noise filter is disposed in space between the connection portion and the speed reducer.

3. The drive unit according to claim 1,
wherein the transaxle case includes:
a motor case that houses the motor; and
a gear case that houses the speed reducer and the differential mechanism,
wherein a PCU case that houses the power control unit is attached to the motor case, and
the noise filter is attached to the motor case in a state of being disposed in space between a back surface of the PCU case and the motor case.

* * * * *